United States Patent [19]

Bresie et al.

[11] Patent Number: 4,527,816
[45] Date of Patent: Jul. 9, 1985

[54] SAFETY COUPLING ARRANGEMENT

[76] Inventors: Don A. Bresie; Jack M. Burns; Donald W. Fowler; Marion S. Sheets, all of 5407 N. IH 35, Suite 304, Austin, Tex. 73723

[21] Appl. No.: 428,856

[22] Filed: Sep. 30, 1982

[51] Int. Cl.³ ............................................. F16L 15/00
[52] U.S. Cl. .................................... 285/81; 285/277; 285/319; 403/23; 403/286
[58] Field of Search .................. 285/81, 38, 315, 316, 285/82, 86, 319, 277; 403/23, 286

[56] References Cited

U.S. PATENT DOCUMENTS

| | | | |
|---|---|---|---|
| 1,436,882 | 11/1922 | Knepper | 285/319 |
| 2,673,750 | 3/1954 | Scheiwer | 285/277 |
| 3,266,825 | 8/1966 | Magorien | 285/277 |
| 3,649,053 | 3/1972 | Snyder, Jr. | 285/316 |
| 3,680,893 | 8/1972 | Giraud | 285/316 |
| 3,761,117 | 9/1973 | Shendure | 285/277 |
| 3,881,753 | 5/1975 | Bochory | 285/82 |
| 3,937,499 | 2/1976 | Courtot | 285/319 |
| 3,945,669 | 3/1976 | Bochory | 285/82 |
| 4,148,459 | 4/1979 | Martinez | 285/316 |

FOREIGN PATENT DOCUMENTS 756608 9/1956 United Kingdom ............... 285/277

Primary Examiner—Cornelius J. Husar
Assistant Examiner—Todd G. Williams
Attorney, Agent, or Firm—F. D. Thomas, Jr.; F. B. Francois

[57] ABSTRACT

A safety cage including two end plates connected by straps extending therebetween is adapted to be placed over an assembled quick connect-disconnect coupling, and the end plates engage behind abutment surfaces on the coupling to prevent accidental separation of the coupling elements. The cage also carries a pair of spaced vertical bars that engage a shoulder on the operating sleeve of the coupling, and lock it against any axial movement. The coupling includes an abutment ring that prevents any forward shifting of the sleeve because of component wear, further eliminating the possibility of accidental separation.

10 Claims, 5 Drawing Figures

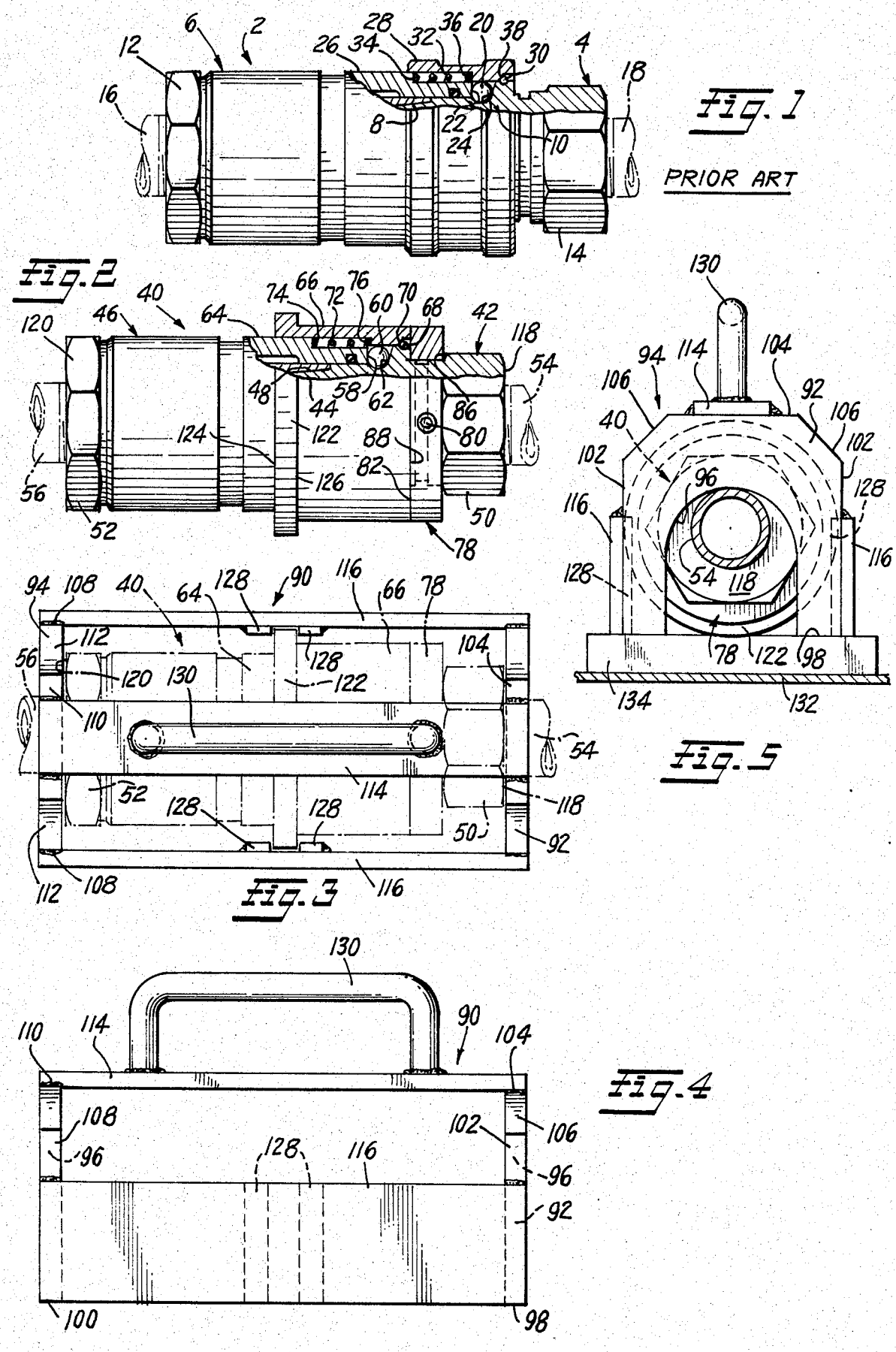

SAFETY COUPLING ARRANGEMENT

TECHNICAL FIELD OF THE INVENTION

The present invention relates generally to quick connect-disconnect couplings of the type commonly utilized to connect conduits employed to conduct fluids, and more particularly to an arrangement for utilization with such couplings to make them failsafe when working with high-pressure fluids.

BACKGROUND OF THE INVENTION

The need frequently arises when handling fluids to connect one conduit with another. When the installation is such that repeated connections and disconnections are required, it is desirable to utilize a coupling device that can be quickly joined and disconnected. A number of couplings or connectors have been devised over the years to meet this need, and such are commonly called quick connect-disconnect couplings.

While there are several designs for quick connect-disconnect couplings, the type to which this invention relates will typically include a male element having a nose portion that is receivable within the socket of a female element, the outer ends of the two elements being equipped with means to connect them with fluid conduits. One of the elements, typcially the female element, will carry releasable detent means, adapted to engage with groove means on the other element when the two are interengaged. A slidable sleeve will be mounted on the element carrying the detent means, and is movable between a locking position in which it locks the detent means in engagement with the groove means, and a retracted position in which disengagement of the two coupling elements can occur. Typically, the detent means will consist of an annular array of balls mounted in a race, and the sleeve will be biased toward its locking position by a spring. Movement of the sleeve toward the locking position will usually be arrested by a simple snap ring or the like, which is engaged by a shoulder on the sleeve.

When the fluid pressures involved are relatively low, the wear factors affecting a quick connect-disconnect coupling of the type just described are minor, and a long period of trouble-free use is commonly obtained from the coupling. However, it has been found that when operating fluid pressures are high, perhaps in the 2,000 to 3,000 psi range, the typical commercially available quick connect-disconnect coupling can become subject to wear over a relatively short time that will affect its performance, and which can result in accidental disconnecting. When this occurs during handling of a high-pressure fluid, the result can be quite damaging. This is particularly true if the fluid involved is a hazardous material, such as natural gas or the like.

One use for quick connect-disconnect couplings is in equipment utilized to transport natural gas under high pressures in pressure vessels, a method and system for accomplishing this having been first advanced in U.S. Pat. No. 4,139,019. In that patent quick connect-disconnect couplings are utilized to connect a loading conduit with a vehicle-mounted pressure vessel means, the latter having a loading manifold provided with one element of such a coupling. The other coupling element is mounted on the end of the loading cohduit. The quick connect-disconnect coupling in the patent must be made up each time a new pressure vessel means is connected to receive natural gas, and the pressures involved will be in the 2,000 to 3,000 psi range.

If the quick connect-disconnect coupling employed in practicing the invention of the cited patent should accidentally fail while under high pressure, a serious situation could result. First of all, separation of the coupling elements could result in one of the elements being propelled at high velocity into equipment or persons situated nearby, causing damage or injury. Secondly, if the failure of the coupling allows natural gas to escape, the possibility of a fire or an explosion would exist. Obviously, accidental separation of the coupling elements should be avoided, if at all possible.

It has been found that accidental uncouplings can occur if the workman does not properly engage the male and female elements, or if the sleeve controlling the detent means is not fully moved into its locking position. Further, it has also been found that under high-pressure conditions and repeated usage, the detent means and components associated therewith tend to wear more quickly than usual. This wear, while often being relatively minor, can nevertheless be sufficient to allow the sleeve to move axially in either direction, resulting in an uncoupling action.

There is need for a safety arrangement for utilization with such quick connect-disconnect couplings, one that will assure that the coupling components are in proper interengaged relationship before high-pressure fluid is applied to the conduits, which will maintain the coupling components in proper relationship during fluid flow, and which will prevent damage should the coupling fail. The present invention is intended to satisfy this need.

SUMMARY OF THE INVENTION

In the safety arrangement of the invention a safety cage is employed to maintain the coupling components in proper connected relationship, and to prevent damage in the event the coupling should fail. Further, the safety cage is so designed that it cannot be properly installed unless the coupling components are first placed in proper relationship to each other, assuring that the coupling is properly made-up before pressure is applied.

The quick connect-disconnect coupling is itself modified, should it not be properly constructed to function with the present safety cage. In the safety arrangement of the invention it is necessary that the slidable sleeve of the quick connect-disconnect coupling have an annular rib formed thereon, arranged to extend outwardly and designed so that it can be engaged from both sides. In addition, the outer end portions of the male and female coupling elements must have radial abutment surfaces thereon. Finally, the detent and groove means of the coupling must be so arranged that the relative positions of the male and female elements and the sleeve will be the same each time the coupling is made up.

Except possibly for the annular rib on the sleeve, commercially available quick connect-disconnect couplings can usually be found having the characteristics just mentioned. When the slidable sleeve provided with a purchased coupling is not equipped with the annular rib feature, it is normally an easy matter to substitute a proper sleeve.

The safety cage includes a pair of parallel end plates which have inverted U-shaped cutouts in their bottom edges, and which are connected by a top strap and two side straps secured to the plates and extending therebetween. The spacing between the confronting faces of the parallel end plates is just slightly greater than the distance measured between the radial abutment surfaces on the outer ends of the coupling elements, and the safety cage is designed so that it will fit down over a properly made-up coupling with the end plates placed in confronting relationship behind the abutment surfaces. This arrangement makes it impossible for the male and female coupling elements to separate, should the detent means or the groove means fail.

In order to assure an even application of force to the end plates, the side straps extend downwardly from a horizontal plane containing the central axis of the coupling. Thus, the top strap and the two side straps are arrayed about the central coupling axis. This assures that force from a failed coupling will be applied to three spaced locations on the end plates, disposed about the coupling's axis.

At least one of the side straps has a pair of spaced vertical bars on its inner surface, designed and positioned so that the bars will engage on either side of the sleeve's annular rib when the coupling is properly made-up and the safety cage is placed thereon. The spacing between the vertical bars is just slightly greater than the axial thickness of the rib, and preferably the vertical bars are provided on both side straps so that the annular rib is engaged at diametrically opposite points.

When the safety cage is placed on the quick connect-disconnect coupling after the latter has been properly interengaged and locked, the pairs of vertical bars will prevent any axial shifting of the sleeve relative to the coupling elements. Thus, even if the detent means, the groove means, or the inner surfaces of the sleeve are worn, axial shifting of the sleeve cannot occur and an accidental uncoupling will normally not be possible. If an accidental uncoupling should occur for some reason, however, then the end plates and the top and side straps will function to prevent the coupling elements from being propelled apart, assuring that damage to nearby equipment and persons will be avoided.

Another important aspect of the invention is that the safety cage of the invention cannot be properly installed on the coupling unless it has been properly made-up. That is, unless the male member is fully inserted into the female member, the end plates of the safety cage cannot be engaged behind the two abutment surfaces on the outer ends of the coupling. Further, unless the sleeve is in proper position relative to the two coupling elements, the vertical bars cannot be engaged on the opposite sides of the sleeve rib. Accordingly, it is seen that the safety cage of the invention performs the vital role of informing the operator that a coupling is properly made-up.

Returning again to the matter of wear in the coupling parts, it has been found that over a period of time the combination of detent wear and wear of the coupling sleeve can result in making it possible for the coupling sleeve to slide forwardly a small distance in the locking direction. In addition, wear of the snap ring utilized to arrest movement of the coupling sleeve will sometimes allow a small degree of forward sleeve movement. If such wear is sufficient to allow significant forward sleeve movement, release of the detent means occurs and accidental uncoupling will result, a problem that increases over the lifetime of the coupling. It has been found that this problem can be solved, and proper make-up of the coupling better assured, by installing an annular collar on the male coupling element, arranged to be positively engaged by the front end of the sleeve when the latter is in its proper position. This is an additional feature of the present invention, and contributes to the present safety coupling arrangement.

It is the principal object of the present invention to provide a safety coupling arrangement that will guard against accidental separation of the elements of a quick connect-disconnect coupling, and that can be easily employed by an operator.

Another object is to provide a safety coupling arrangement designed to indicate to an operator when a quick connect-disconnect coupling has been properly made-up.

A further object is to provide a safety cage adapted to be placed over a quick connect-disconnect coupling, and designed to inform an operator that the coupling has been properly made-up, to prevent accidental disconnection of the coupling elements, and to prevent separation of the coupling elements should failure of the coupling occur.

Yet another object is to provide a safety cage that is designed to assure that force applied to the end plates thereof will be spread out over the area of the end plates.

Another object is to provide an annular collar for a quick connect-disconnect coupling, arranged to prevent improper forward movement of the slidable coupling sleeve from its locking position.

Other objects and many of the attendant advantages of the present invention will become readily apparent from the following Description of the Preferred Embodiment, when taken in conjunction with the accompanying drawings.

BRIEF DESCRIPTION OF THE DRAWINGS

FIG. 1 is a plan view of a conventional quick connect-disconnect coupling partly in section and including in phantom lines the conduits that are to be connected thereto;

FIG. 2 is a directly comparable plan view of the present invention, partly in section and also showing in phantom lines the conduits to be connected thereto;

FIG. 3 is a top plan view of a further arrangement of the present invention, including means for assuring security of the coupling, the coupling itself and the aforesaid conduits being shown in phantom lines;

FIG. 4 is a side view of the means shown in FIG. 3 for assuring security of the coupling; and FIG. 5 is an end view of the arrangement shown in FIG. 3, taken from the right-hand end thereof.

DESCRIPTION OF THE PREFERRED EMBODIMENTS

Referring first to FIG. 1, a conventional prior art quick connect-disconnect coupling of the kind available commercially is indicated generally at 2, and includes a male element 4 having a nose portion 10, a female element 6 having a socket 8 in one end thereof adapted to receive the nose portion 10, and connector means 12 and 14 on the outer ends of the coupling elements 4 and 6, respectively, for connecting conduits 16 and 18 thereto. The female element 6 carries a plurality of ball detents 20 in openings 22 therein, which are engageable in an annular groove 24 carried on the nose 10 of the male element 4.

Slidably mounted on the outer cylindrical surface 26 of the front portion of the female element 6 is a sleeve 28, forward motion of the sleeve 28 being arrested by a snap ring 30 carried in a groove on the female element. A coil spring 32 is positioned between a shoulder 34 on the female element 6 and a radial shoulder 36 carried on the interior of the sleeve 28, and functions to bias the sleeve 28 into engagement with the snap ring 30. The coupling 2 is designed so that when the sleeve 28 is in engagement with the snap ring 30 it is in its locking position, and the ball detents 20 are then held in engagement with the walls of the annular groove 24. The sleeve 28 can be shifted to the left in FIG. 1 against the spring 32 into its retracted position, which releases the ball detents 20 so that the coupling 2 can be opened.

The structure as just described is well known in the art. Typically, the coupling 2 will also include valve means between the male and female elements 4 and 6 (not shown), so that no flow from either of the conduits 16 or 18 can occur when the elements are disengaged. When the male and female elements 4 and 6 are properly interengaged and the sleeve 28 is properly in position, the coupling of FIG. 1 is very secure and can withstand high fluid pressures.

It has been found, however, as was described earlier, that when a coupling like that shown in FIG. 1 is repeatedly opened and closed in an environment of high pressure, over a period of time, wear of the components can affect its effectiveness. As long as the sleeve 28 is properly positioned over the ball detents 20, the coupling will be engaged. However, as wear occurs this relationship is not always assured.

One place where wear normally occurs is between the detent balls 20 and the tapered shoulder 38 of the sleeve 28 which engages the snap ring 30. This shoulder is tapered to facilitate its passage over the ball detents 20, and repeated engagement with the balls 20 can cause it to wear. When this occurs, it can happen that the shoulder 38 will ride up sufficiently on the snap ring 30 that the shoulder 36 of the sleeve 28 will eventually be moved forwardly over the center of the ball detents 20. Should this occur, the coupling elements 4 and 6 may disengage. The possibility of such an accidental disengagement occuring is increased when operating fluid pressures are in the 2,000 to 3,000 psi range, as is required to practice the invention of the cited patent. These high pressures can create vibrations in the coupling elements, which can accelerate wear of coupling components and make escape of the ball detents 20 more possible.

In instances where an accidental disengagement of a coupling like that shown at 2 in FIG. 1 has occurred, the cause has been traced to forward shifting of the sleeve 28. Thus, if forward movement of the sleeve 28 can be prevented, the possibilities of an accidental disengagement are lessened. A coupling which achieves this goal is shown at 40 in FIG. 2.

The quick connect-disconnect coupling 40 is constructed according to the present invention, but is similar to the coupling 2 in how it functions. The coupling 40 includes a male element 42 having a nose portion 44, a female element 46 having a socket 48 for receiving the nose 44, and connectors 50 and 52 on the outer ends of the elements 44 and 46, respectively, for connecting the coupler to conduits 54 and 56.

The wall defining the socket 48 of the female element 46 has openings 58 therein which receive ball detents 60, the detents being engageable in an annular groove 62 on the nose 44 of the male element 42. Mounted on the outer cylindrical surface 64 of the female element 46 is a slidable sleeve 66, secured on the female element 46 by a snap ring 68 that is engaged by a tapered shoulder 70 on the sleeve. Coil spring 72 is compressed between a shoulder 74 on the female element 46 and a shoulder 76 within the sleeve 66, and biases the sleeve 66 into engagement with the snap ring 68. To this point, the coupling 40 is substantially indentical to the coupling 2 of FIG. 1.

An annular abutment ring 78 is utilized in FIG. 2 to prevent forward motion of the sleeve 66 beyond the point where the original design thereof assures maximum retention of the ball detents 60. As has been noted, in FIG. 1 engagement of the tapered shoulder 38 with the snap ring 30 is the mechanism utilized to ensure proper positioning of the sleeve 28, but, as discussed, this arrangement can fail through wear of the coupling components. In FIG. 2 the prime device utilized to assure proper positioning of the sleeve 66 relative to the ball detents 60 is the abutment ring 78, and not the snap ring 68.

The abutment ring 78 is fixed on the male element 42 by one or more set screws 80, and includes front and rear abutment faces 82 and 84. The rear abutment face 84 engages and seats against a shoulder 86 formed on the male element 42. The front abutment face 82 is positioned to be engaged by a confronting abutment face 88 on the front end of the sleeve 66. The axial thickness of the abutment ring 78 is chosen so that when the faces 82 and 88 are in engagement, the sleeve 66 will be positioned for maximum effectiveness in holding the ball detents 60 in their mating groove 62, and the spring 72 functions to maintain this engagement except when the sleeve 66 has been forcefully retracted against the force exerted by the spring.

It will be noted that the coupling 40 utilizes a different abutment face on the sleeve 66 to check forward movement thereof than does the sleeve 28 of FIG. 1. In FIG. 1, the same tapered surface 38 that is subject to wear from repeated engagement with the ball detents 20 is also utilized in conjunction with the snap ring 30 to stop forward movement of the sleeve. In FIG. 2, by contrast, the tapered surface 70 that engages the ball detents 60 still also engages the snap ring 68, but this is not the only check on forward movement of the sleeve 66. Rather, the principal device for stopping forward movement of the sleeve 66 in FIG. 2 is the large, radial abutment face 88 that engages the large, radial face 82 on the abutment ring 78. The mating radial faces 82 and 88 serve only to stop forward motion of the sleeve 66, and are not engaged with other components that can wear them down.

Referring now to FIGS. 3 through 5, a further arrangement for assuring security of the coupling 40 is illustrated. In these figures, a safety cage 90 is shown, which is adapted to be placed upon the coupling 40 once the latter has been properly made-up. The safety cage 90 includes two parallel end plates 92 and 94, having inverted U-shaped cutouts 96 in their bottom edges 98 and 100, respectively. As is best shown in FIG. 5, the end plates 92 and 94 have cross-sectional dimensions that are somewhat larger than the maximum cross-sectional dimensions of the coupling 40. The end plate 92 has parallel side edges 102, a top edge 104 that is parallel to the bottom edge 98 and which extends at a right angle to the side edges 102, and upper corner edges 106 cut on about a 45° angle. Similarly, the end plate 94 has parallel side edges 108, a top edge 110, and angled top corner edges 112.

The two parallel end plates 92 and 94 are connected to each other by a top strap member 114 and side strap members 116. The top strap member 114 is welded centrally to the top edges 104 and 110, as shown in FIG. 3, and extends therebetween. Referring to FIG. 4, the side straps 116 also extend between the end plates 92 and 94 and are welded to the lower portions of their side edges 102 and 108. The axial spacing between the confronting inner surfaces of the end plates 92 and 94 is chosen as follows.

Referring again to FIGS. 2 and 3, the opposite ends of the coupling 40 have radial abutment surfaces 118 and 120 on the ends of the male and female elements 42 and 46, respectively, the surfaces 118 and 120 actually being located on the connectors 50 and 52. The spacing between the end plates 92 and 94 is chosen to be just slightly greater than the distance measured between the radial abutment surfaces 118 and 120, so that the safety cage 90 will fit snugly over the coupling 40 as shown in FIGS. 3 and 5. With the safety cage 90 in place on the coupling 40, even if the interengaged ball detent and groove arrangement should fail, the male and female elements 42 and 46 cannot separate.

As shown in FIG. 5, the cutouts 96 are sufficiently large to easily accommodate the conduits 54 and 56, but a substantial area remaining around the periphery thereof to face the end abutment surfaces 118 and 120. Further, the side strap members 116 are positioned so that they extend downwardly from the horizontal plane containing the central axis of the coupling 40. With the side straps 116 so placed, they will function together with the top strap 114 to assure that if the abutment surfaces 118 and 120 exert pressure upon the end plates 92 and 94, such pressure will be rather generally spread over the plates. This further increases the safety aspects of the invention by avoiding an undesirable concentration of force in the safety cage 90.

It should also be noted that if the male element 42 is not fully inserted into the female element 46, then the safety cage 90 cannot be placed on the coupling 40. This occurs because of the close spacing between the end plates 92 and 94 and their confronting abutment surfaces 118 and 120, and indicates to an operator that the coupling is not properly made up.

Referring now to FIGS. 2 and 3 in particular, the rear end of the sleeve 66 carries an annular rib 122 thereon, which includes front and rear radial abutment faces 124 and 126, respectively. The diameter of the annular rib 122 is just slightly less than the spacing measured between the confronting inner surfaces of the side straps 116, and the latter each carry thereon a pair of spaced vertical bars 128, welded in place. The vertical bars 128 of each pair are spaced apart a distance just slightly greater than the thickness of the rib 122, so that they will fit snugly thereover. It should be noted that the two pairs of vertical bars 128 are spaced oppositely, which permits them to engage the diametrically opposite sides of the annular rib 122.

The pairs of vertical bars 128 serve two functions in the invention. First, unless the sleeve 66 is initially in a correct position relative to the male and female elements 42 and 46, the annular rib 122 will not be aligned for reception between the vertical bars 128. This will indicate to the operator that a problem exists with the coupling, and will help avoid improper assembly.

Secondly, once the safety cage 90 is properly assembled on the coupling 40, with the diametrically opposite positions of the rib 122 received between the two pairs of vertical bars 128, movement of the sleeve 66 in either axial direction is blocked. This functions to secure the sleeve 66 in its locking position, which enhances the safety of the coupling by helping to prevent accidental disconnecting. Before the operator can manually disconnect the coupling 40, the safety cage 90 must first be removed.

Referring again to the drawings, the top strap member 114 of the safety cage 90 is provided with an inverted U-shaped handle 130, to ease the installation and removal thereof.

It is possible for the safety cage 90 to be rotated about the axis of the coupling 40 in FIGS. 3 and 4. If this should occur, then it could tilt to a point where it would fall free of the coupling. It has been found that this is normally not a serious problem in service, but nevertheless the possibility exists. Referring again to FIG. 5, an arrangement is shown which eliminates this possibility.

In FIG. 5, the conduit 54 is shown in fixed relationship with an underlying surface 132. Referring again to the cited patent, for example, the underlying surface 132 would be a portion of the truck bed upon which the pressure vessels are carried, and the conduit 54 would be affixed to the vehicle loading manifold system to provide the arrangement of FIG. 5.

A mounting plate 134 is shown mounted on the underlying surface 132 in FIG. 5, and is designed so that the bottom edges 98 and 100 of the safety cage 90 will rest thereon when the cage is properly installed on the coupling 40. With this arrangement, accidental rotation of the safety cage 90 about the axis of the coupling 40 cannot occur.

It will be evident that the safety coupling arrangement of the invention substantially eliminates the possibility of damage occurring, should the connection between the male and female elements of the quick connect-disconnect coupling 40 fail while under high pressure. Further, the annular ring 78 and its arrangement, and the arrangement of the annular rib 122 and the vertical spaced bars 128, will prevent failure of the connection in all but the most unusual circumstances. Accordingly, the present safety coupling arrangement contributes significantly to the protection of persons and property while handling high pressure fluids, and especially hazardous fluids such as natural gas.

Obviously, many modifications and variations of the invention are possible, without departing from the teachings herein. For example, the configuration of the end plates 92 and 94 can be varied, as can the configuration and placement of the strap members 114 and 116 connecting the end plates. Further, the safety cage 90 can be adapted for use with couplings other than the coupling 40, if so desired.

We claim:

1. A safety coupling arrangement for use in handling high pressure fluids, including:
    a quick connect-disconnect coupling, including a male element and a female element adapted for interengagement and axially slidable means for use in effecting disconnection of said coupling elements, said coupling elements being provided with connector means on their respective outer end portions for connecting with conduits for carrying high pressure fluids, and having generally radial abutment surfaces on said outer end portions; and
    a safety cage adapted to be received over said quick connect-disconnect coupling after said male and female coupling elements have been interengaged;

said safety cage having an axial length greater than the distance measured between said generally radial abutment surfaces on the outer end portions of said coupling elements when said elements are interengaged, and being designed and arranged to engage behind said abutment surfaces so as to prevent said interengaged coupling elements from premature separation;

said safety cage comprising:

a pair of parallel end plates, said end plates having cross-sectional dimensions larger than the maximum cross-sectional dimensions of said coupling, and each end plate having an inverted, generally U-shaped cutout in the bottom edge thereof so that it can be placed over conduits connected with said connector means on said coupling outer ends;

top strap means connected at its opposite ends to the upper portions of said end plates, and extending therebetween;

a pair of side strap means, said side strap means being disposed on the opposite sides of said end plates, and each being secured at its opposite ends to the side edge portions of said end plates and extending therebetween;

said top and side connecting strap means serving to space the inner, confronting surfaces of said parallel end plates a distance apart that is slightly greater than the distance measured between said abutment surfaces on the outer end portions of said coupling elements when said male and female coupling elements are interengaged, and said inverted cutouts being sufficiently small in cross-section that the areas around the peripheries thereof confront said abutment surfaces when said safety cage is placed upon said coupling; and means carried by at least one of said top and said side strap means, arranged to be engageable with said axially slidable coupling means when said safety cage is received over said coupling, to prevent relative movement of said axially slidable means into a position wherein said coupling elements can be disconnected.

2. A safety coupling arrangement as recited in claim 1, wherein said top strap means is disposed above a horizontal plane containing the axis of said coupling and said side strap means extend below said horizontal plane, whereby force applied to said end plates by said radial abutment surfaces is spread across said end plates.

3. A safety coupling arrangement as recited in claim 1, including additionally:

a handle carried by said top strap means.

4. A safety coupling arrangement as recited in claim 1, including additionally:

a surface extending below and spaced from said quick connect-disconnect coupling;

the bottom edges of said end plates resting on said surface when said safety cage is properly positioned on said coupling, whereby said safety cage is prevented from rotating about the axis of said coupling.

5. A safety coupling arrangement for us in handling high pressure fluids, including:

a quick connect-disconnect coupling, including:

a male element and a female element adapted for interengagement, said coupling elements being provided with connector means on their respective outer end portions for connecting with conduits for carrying high pressure fluids, and having generally radial abutment surfaces on said outer end portions;

interengageable, releasable detent and groove means carried by said coupling elements;

a sleeve slidably received on one of said coupling elements and having a radially outwardly projecting annular rib formed thereon, said sleeve being normally movable relative to said coupling elements between a locking position wherein said sleeve locks said detent means in engagement with said groove means while such are interengaged, and a retracted position wherein said detent means can be disengaged from said groove means to allow said male element to be separated from said female element; and spring means arranged to bias said slidable sleeve toward said locking position thereof; and means engageable with said sleeve, designed and arranged to maintain it in said locking position, including;

a safety cage adapted to be received over said quick connect-disconnect coupling after said male and female coupling elements and said detent and groove means have been properly interengaged, said safety cage including:

a pair of parallel end plates, said end plates having cross-sectional dimensions larger than the maximum cross-sectional dimensions of said coupling, and each end plate having an inverted, generally U-shaped cutout in the bottom edge thereof so that it can be placed over conduits connected with said connector means on said coupling outer ends;

connecting strap means extending between said parallel end plates, and serving to space the inner, confronting surfaces of said parallel end plates a distance apart that is slightly greater than the distance measured between said abutment surfaces on the outer end portions of said coupling elements when said male and female coupling elements are interengaged, said inverted cutouts being sufficiently small in cross-section that the areas around the peripheries thereof confront said abutment surfaces when said safety cage is placed upon said coupling; and at least one pair of spaced, vertical bars carried by said connecting strap means and arranged to receive said projecting annular rib on said sleeve therebetween when said safety cage is placed upon said coupling, said bars being arranged to prevent axial shifting of said annular rib and its associated sleeve in either direction relative to said coupling elements while said safty cage is in place upon said coupling.

6. A safety coupling arrangement as recited in claim 7, wherein said connecting strap means includes:

top strap means connected at its opposite ends to the upper portions of said end plates, and extending therebetween; and a pair of side strap means, said side strap means being disposed on the opposite side of said end plates, and each being secured at its opposite ends to the side edge portions of said end plates and extending therebetween;

said top strap means being disposed above a horizontal plane containing the axis of said coupling and said side strap means extending below said horizontal plane, whereby force applied to said end plates by said radial abutment surfaces is spread across said end plates; and said pair of spaced, vertical bars for receiving said projecting annular rib being carried on the inner surface of one of said side strap means.

7. A safety coupling arrangement as recited in claim 6, including two pair of said spaced, vertical bars, one mounted on the inner surface of each of said side strap means, said two pairs of spaced, vertical bars being oppositely disposed and serving to engage generally diametrically opposite edge portions of said annular rib.

8. A safety coupling arrangement as recited in claim 6, wherein said means engageable with said sleeve for maintaining it in said locking position further includes;

an abutment face formed on the front end of said sleeve, spaced from and having no operational function relative to said detent and groove means; and an abutment ring mounted on the coupling element not carrying said slidable sleeve, and having an abutment face positioned to be engaged by said abutment face on the front end of said sleeve when said sleeve is in said locking position, to prevent any forward movement of said sleeve from its locking position;

said annular rib being receivable between said pair of vertical bars only when said abutment face on the front end of said sleeve is in engagement with the abutment face of said abutment ring.

9. A safety cage for use in securing together the male and female elements of a coupling when such are interengaged so as to prevent accidental separation thereof, said coupling elements including axially slidable means for use in effecting disconnection of said elements from each other, and being provided with connector means on their respective outer end portions for connecting with conduits for carrying high pressure fluids and having generally radial abutment surfaces on said outer end portions, and said safety cage comprising:

a pair of parallel end plates, said end plates having cross-sectional dimensions larger than the maximum cross-sectional dimensions of said coupling, and each end plate having an inverted, generally U-shaped cutout in the bottom edge thereof so that it can be placed over conduits connected with said connector means on said coupling outer ends;

a top connecting strap connected at its opposite ends to the upper portions of said end plates, and extending therebetween;

a pair of side connecting straps disposed on opposite sides of said end plates, and each being secured at its opposite ends to the side edge portions of said end plates and extending therebetween, said side connecting straps extending downwardly from the horizontal plane containing the axis of a coupling upon which said safety cage is placed;

said top and side connecting straps serving to space the inner, confronting surfaces of said parallel end plates a distance apart that is slightly greater than the distance measured between said abutment surfaces on the outer end portions of said coupling elements when said male and female coupling elements are interengaged, and said inverted cutouts being sufficiently small in cross-section that the areas around the peripheries thereof confront said abutment surfaces when said safety cage is placed upon said coupling; and means carried by at least one of said side straps, arranged to be engageable with said axially slidable means of said coupling when said safety cage is received over said coupling, to prevent relative movement of said axially slidable means into a position wherein said coupling elements can be disconnected.

10. A safety cage as recited in claim 9, including additionally:

a handle carried by said top strap.

* * * * *